United States Patent
Henrick et al.

[15] 3,682,970

[45] Aug. 8, 1972

[54] PRODUCTION OF UNSATURATED CARBOCYCLIC KETONES

[72] Inventors: Clive A. Henrick, Palo Alto; John A. Edwards, Los Altos; John H. Fried, Palo Alto, all of Calif.

[73] Assignee: Syntex Corporation, Panama, Panama

[22] Filed: March 27, 1969

[21] Appl. No.: 811,237

[52] U.S. Cl..........260/327 M, 260/247, 260/293.51, 260/340.9, 260/345.7, 260/345.8, 260/345.9, 260/347.2, 260/347.3, 260/347.4, 260/347.8, 260/397.5, 260/469, 260/514 R, 260/526 S, 260/544 L, 260/546, 260/586 R, 424/238, 424/241, 260/606.5 P

[51] Int. Cl.......C07d 73/00, C07d 13/04, C07d 7/04

[58] Field of Search................................260/340.9, 586 R, 327 M, 514 R, 260/340.9, 345.9, 345.7, 347.3

[56] References Cited

UNITED STATES PATENTS 3,472,885   10/1969   Bucourt et al........260/397.45

*Primary Examiner*—Henry R. Jiles
*Assistant Examiner*—Cecilia M. Shurko
*Attorney*—Evelyn K. Merker and William B. Walker

[57] ABSTRACT

Preparation of $\alpha,\beta$-unsaturated carbocyclic ketones by reacting a methylene or methine phosphonium ylid with a $\delta$-keto carboxylic acid ester, anhydride or acyl halide. The reaction is useful for producing intermediates for synthesis of known steroids having estrogenic, progestational, or anabolic activity, for example.

7 Claims, No Drawings

PRODUCTION OF UNSATURATED CARBOCYCLIC KETONES

This invention relates to the production of unsaturated carbocyclic ketones. More particularly, this invention relates to a novel process for converting δ-keto carboxylic acid esters, anhydrides or acyl halides into α,β-unsaturated carbocyclic ketones.

The expression "δ-keto carbocyclic acid," as used herein, refers to cyclopentyl propionic acid compounds having a keto group and the propionic acid group attached to adjacent carbon atoms of a cyclopentyl ring. The expression "α,β-unsaturated carbocyclic ketones," as used herein, refers to carbocyclic ketones having α,β-ethylenic unsaturation with respect to the keto group.

Prior to this invention, α,β-unsaturated carbocyclic ketones were produced from keto carboxylic acids by a multi-step process which involved converting the keto carboxylic acid to the corresponding enol lactone by treatment with acetic anhydride-sodium acetate, reacting the enol lactone with a Grignard reagent, for example, methyl magnesium chloride, to open the lactone ring, and thereafter cyclizing the thus-obtained diketonic intermediate product by treatment with acid or alkali to obtain the carbocyclic ketone. See, for example U.S. Pat. Nos. 3,057,907 and 3,321,489 and French Pat. No. 1,359,675.

The principle object of this invention, therefore, is to provide an improved process for producing α,β-unsaturated carbocyclic ketones from keto carboxylic acid esters, anhydrides, or acyl halides which overcomes the aforementioned disadvantages. Another object of this invention is to provide a process for producing α,β-unsaturated carbocyclic ketones which is economical and simple to operate.

Another object of this invention is to provide a single-step process for producing α,β-unsaturated carbocyclic ketones. Still another object of this invention is to provide a process for producing α,β-unsaturated carbocyclic ketones which is useful in the total synthesis of steroids and to novel intermediates therefor.

In general, the process of this invention is a method for producing α,β-unsaturated carbocyclic ketones which comprises reacting, under anhydrous conditions in an inert organic solvent, a methylene phosphonium ylid represented by the formula

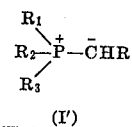

(I)

with a lower alkyl ester, aryl ester having up to 10 carbons, lower alkylthio ester, lower alkylcarboxylic acid anhydride, or acyl halide of a 2-oxo-1-cyclopentylpropionic acid, wherein R is selected from the group consisting of hydrogen and substituted and unsubstituted, saturated and unsaturated, aliphatic, carbocyclic and carbocyclic-aliphatic radicals, and each of $R_1$, $R_2$ and $R_3$ is selected from the group consisting of substituted and unsubstituted, saturated and unsaturated, aliphatic and carbocyclic radicals and lower alkoxy radicals, about two molar equivalents of said ylid being present for each mole of said 2-oxo-1-cyclopentylpropionic acid ester, anhydride or acyl halide.

The phosphonium ylids which are useful in the production of α,β-unsaturated carbocyclic ketones by the process of this invention are the methylene phosphonium ylids which can be represented by the following formula

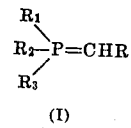

(I)

wherein R, $R_1$, $R_2$ and $R_3$ are as defined above. The phosphonium ylids of the above formula can also be represented as follows

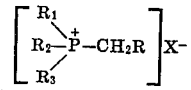

(I')

wherein R, $R_1$, $R_2$ and $R_3$ are as defined above.

Phosphonium ylids of Formulas I and I' can be prepared, for example by reacting the phosphonium halide

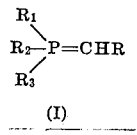

e.g., the bromide or chloride, with a base which is capable of removing hydrogen halide. These phosphonium halides can be prepared by known methods such as by reacting a tertiary phosphine with an organic halide. Suitable bases which can remove hydrogen halide are organometallic compounds such as alkyl or aryl lithium or alkali metal amides. The ylid can be formed in an inert solvent such as ether, tetrahydrofuran or dioxane and preferably in an inert, oxygen-free atmosphere. The method of preparing the phosphonium ylid is not part of the present invention. Procedures for forming methylene phosphonium ylids useful in the present invention and examples of such ylids are described by A. Johnson, W. Johnson (Ylid Chemistry) Academic Press Inc., New York (1966); S. Trippett, Quarterly Reviews, 16, pages 406–440 (1962); S. Trippett, Advances in Organic Chemistry, Vol. I, Interscience, New York pages 83–102 (1960); and A. Maercker, (Organic Reactions), Vol. 14, John Wiley & Sons, New York, pages 270–490 (1965) and in U.S. Pat. Nos. 2,905,717; 2,197,523; 2,917,524; 2,950,321; 2,957,933; 3,078,256 3,130,219; 3,152,152 and 3,347,932.

Methylene phosphonium ylids are sometimes unstable compounds which react easily with oxygen and decompose on standing for any appreciable period of time. Thus, in the practice of the process of the present invention, it is preferable to use tricarbocyclic phosphonium ylids wherein each of $R_1$, $R_2$ and $R_3$ of Formula I is a saturated carbocyclic group, e.g., cyclohexyl or an unsaturated carbocyclic group, e.g., monoaryl such as phenyl, tolyl, anisyl, chlorophenyl, and the like. It is also preferable to avoid isolating the phosphonium ylid; the ylid can be prepared in situ in the reaction medium subsequently used for reacting the ylid with the keto carboxylic acid esters, anhydrides or acyl halides.

While the methylene phosphonium ylids which can be used in the process of this invention are too numerous to list here, they can be exemplified by the following:

methylenetrimethylphosphorane, methylenetricyclohexylphosphorane, methylenetriphenylphosphorane, methylenetri-N-piperidylphosphorane, methylenetri-N-morpholinophosphorane, methylenetri-(p-tolyl)phosphorane, methylenetri-(p-anisyl)phosphorane, methylenetri-(n-butyl)phosphorane, methylenedimethylphenylphosphorane, methylenedimethyl-p-methoxyphenylphosphorane, methylenediphenyltolylphosphorane, methylmethylenetriphenylphosphorane,
(ethylidenetriphenylphosphorane), 3-cycloethylenedioxybutylmethylenetriph enylphosphorane, 3,3-dimethoxypropylmethylenetriphenylphosphorane, ethylmethylenetriphenylphosphorane, n-propylmethylenetriphenylphosphorane, and the like.

Preferred phosphonium ylids for use in the process of this invention are substituted 1-propanyl-3-ylidenetriphenylphosphoranes which can be represented by Formula II:

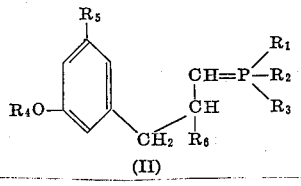

wherein $R_4$ is lower alkyl or other similar alkaline stable, acid labile protecting group, $R_5$ is hydrogen or lower alkoxy, $R_6$ is hydrogen or methyl and $R_1$, $R_2$ and $R_3$ are as defined above.

These preferred phosphonium ylids and a method for their preparation have been described in U.S. Pat. application Ser. No. 747,466 filed July 25, 1968 now abandoned. The method can be generally illustrated by the following representative procedure wherein X is bromo or chloro and $R_1$, $R_2$, $R_3$, $R_4$, $R_5$ and $R_6$ are as defined above.

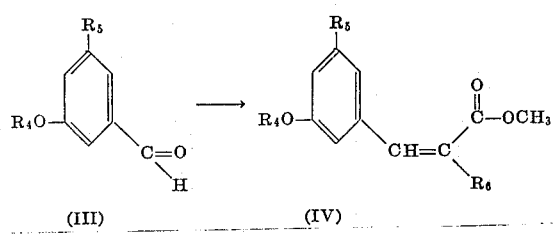

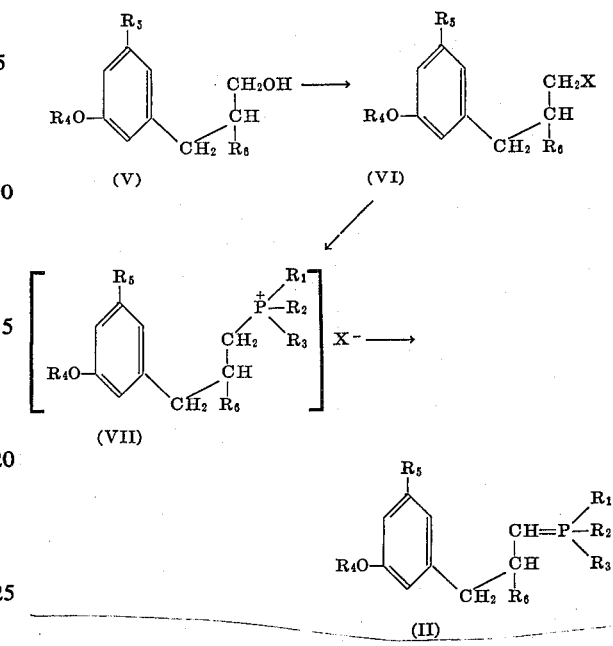

The aldehyde (III) is reacted with methyl α-bromoacetate or methyl α-bromopropionate in an inert anhydrous solvent such as benzene in the presence of zinc dust and then refluxed in the presence of p-toluene sulfonic acid to yield the ester (IV). The ester is then hydrogenated, for example using a five percent palladium-on-carbon catalyst in ethanol to yield the corresponding saturated ester. Reduction of the saturated ester, for example with lithium aluminum hydride in tetrahydrofuran, yields the corresponding alcohol (V). Reaction of the alcohol (V) with phosphorus trichloride or tribromide in an inert solvent such as benzene yields the corresponding halide (VI) which, upon reaction with a phosphine

$R_1$, $R_2$ and $R_3$ being as defined above, e.g., triphenylphosphine, yields the corresponding phosphonium slat (VII). Treatment of the salt with a base capable of removing hydrogen halide such as sodium methylsulfinylmethide, phenyl lithium or butyl lithium yields the corresponding phosphonium ylid (II), for example, 1-methoxy-3-phenylpropylidenetriphenylphosphorane, 1,5-dimethoxy-3-phenylpropylidenetriphenylphosphorane, 1-methoxy-3-phenyl-(2-methylpropylidene)triphenylphosphorane, 1,5-dimethoxy-3-phenyl-(2-methylpropylidene)triphenylphosphorane, and the like.

Other phosphonium ylids useful in the process of this invention can be represented as follows:

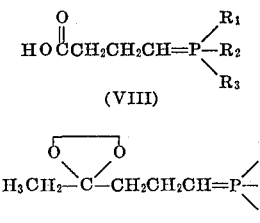

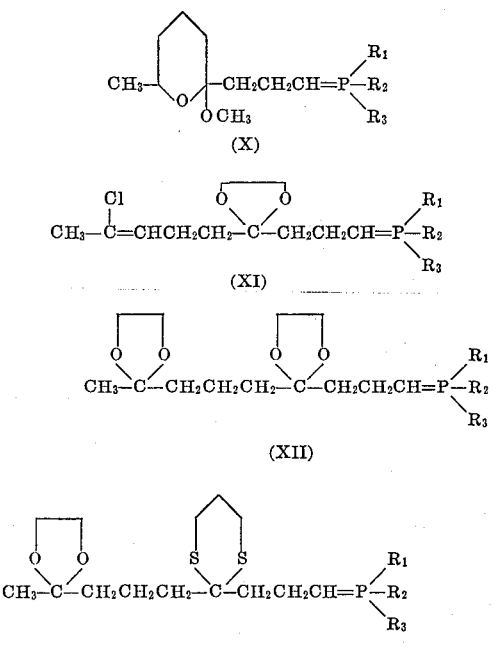

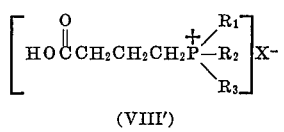

(VIII')

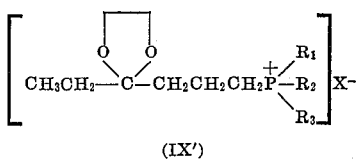

(IX')

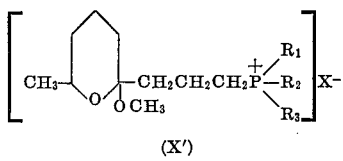

(X')

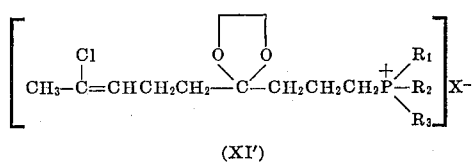

(XI')

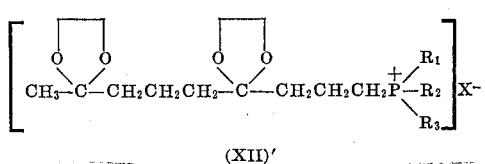

(XII)'

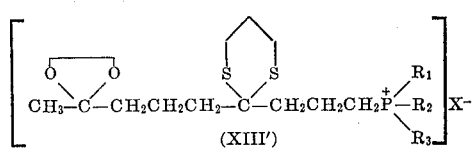

(XIII')

in the above formulas $R_1$, $R_2$ and $R_3$ are as defined above. These phosphonium ylids can be prepared by reaction of the following respective phosphonium halides with a strong base as described hereinabove.

In the above formulas $R_1$, $R_2$ and X are as defined hereinabove.

The δ-keto carboxylic acid esters, anhydrides and acyl halides useful in the process of this invention include 2-oxo-1-cyclopentylpropionic acid esters, anhydrides and acyl halides represented by Formula XIV

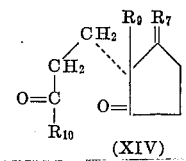

wherein $R_7$ is a suitably protected oxo group (protected with an alkaline-stable, acid-labile protecting group) such as lower alkylenedioxy, e.g., ethylenedioxy or wherein —$OR_8$ is an ether group such as lower alkoxy, e.g., methoxy, ethoxy, t-butoxy, or tetrahydropyran-2-yloxy, tetrahydrofuran-2-yloxy, or 4-methoxytetrahydropyran-4-yloxy and the like;

$R_9$ is lower alkyl; and $R_{10}$ is lower alkoxy, aryloxy (including phenylalkyleneoxy and alkylphenyleneoxy) having up to 10 carbons, lower alkylthio, lower alkanoyloxy, bromo or chloro, e.g., methoxy, ethoxy, butoxy, hexoxy, phenoxy, benzyloxy, tolyloxy, phenylethylene-oxy, methylthio, ethylthio, butylthio, acetyloxy, propionyloxy, valeryloxy, and the like.

In general, the process of this invention can be represented by the following schematic diagram: wherein R, $R_1$, $R_2$, $R_3$, $R_7$, $R_9$ and $R_{10}$ are as defined above.

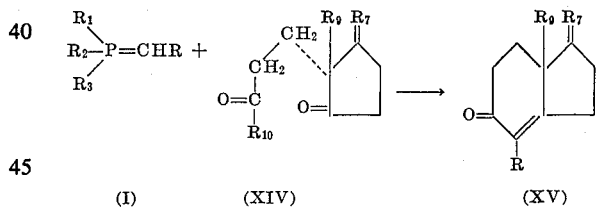

(I)    (XIV)    (XV)

In the process of the present invention, the reaction is carried out with from 1.2 to 2.5 and preferably about 2.1 moles of the phosphonium ylid per mole of the keto carboxylic acid compound of Formula XIV. More than 2.5 equivalents of the phosphonium ylid can be used but it is generally disadvantageous to do so because in some cases the excess reagent may react further with the carbonyl group of the desired carbocyclic ketone. Any organic solvent can be used for the reaction medium so long as it is inert to the reaction and reagents. Suitable organic solvents are set forth in the references listed hereinabove and include hydrocarbons such as benzene, toluene, and the like; ethers such as tetrahydrofuran, dioxane, monoglyme, diglyme, and the like; dialkylsulfoxides such as dimethylsulfoxide, and the like; and mixtures thereof. When the phosphonium ylid is prepared in situ, the keto carboxylic acid compound can be introduced as a solution using the same solvent as that used for the preparation of the ylid. The reaction generally goes to completion in from about 0.5 hours to about 48 hours depending upon such factors as temperature and the relative reactivity of the ylid and keto carboxylic acid compound. The reaction temperature can vary from about −40° C to the reflux temperature of the reaction mixture depending upon such factors as the stability of the ylid, the relative reactivity of the ylid and keto carboxylic acid compound being reacted, and the time in which it is desired to complete the reaction. In the case of the more stable ylids derived from, for example, triarylphosphonium halides such as methylenetriphenylphosphorane, it is best to employ reaction temperatures of about room temperature to elevated temperatures such as the reflux temperature of the reaction mixture, in order to complete the reaction within a shorter period of time.

There is formed an intermediate ylid which in some cases can be isolated, if desired, or the reaction continued without interruption to form the α,β-unsaturated carbocyclic ketone. Whether an intermediate ylid is formed that can be isolated is dependent upon the reactivity of the particular phosphonium ylid and keto carboxylic acid compound being reacted, the solvent medium and the reaction temperature. If it is desired to isolate the intermediate phosphonium ylid, the keto carboxylic acid compound and phosphonium ylid are preferably mixed together at room temperature or below, preferably about 0° C to 15° C. If it is desired not to isolate the intermediate ylid, the reaction can be continued without interruption or it can be continued more efficiently by the addition of a lower monohydric aliphatic alcohol, such as methanol, ethanol, isopropanol, t-butanol, and the like, with or without the addition of a base such as an alkali metal alkoxide, such as sodium methoxide, sodium ethoxide, potassium methoxide, sodium t-butoxide, and the like. The lower alcohol or an alcohol containing a base should be added after the initial reaction of the keto carboxylic acid compound and phosphonium ylid is substantially complete, that is, after substantial disappearance of the initial phosphonium ylid from the reaction mixture. Conventional analytical techniques such as thin layer chromatography can be used to determine when these conditions have been obtained. A part or all of the original solvent can first be removed, if desired, and the alcohol, with or without base, added thereafter. The amount of lower alcohol added should generally be such as to provide at least about 10 percent by volume of the total amount of solvent in the reaction mixture, preferably from about 25 to 80 percent. The amount of base included in the alcohol should be sufficient to provide at least about 0.1 molar equivalents of base per mole of intermediate ylid after reacting with any base-labile groups which might be present, e.g., ester groups. The amount of base is otherwise not critical. The most advantageous amount of base is easily determinable by routine experimentation giving consideration to the particular keto carboxylic acid compound, phosphonium ylid and solvent being employed. In the case of solvents such as diglyme, monoglyme, dialkylsulfoxide, and the like, if it is not desired to isolate the ylid intermediate, it has been found to be advantageous to include or add after mixing the keto carboxylic acid compound and ylid, from about 10 to 75 percent, preferably 25 to 50 percent by volume of the total solvent of a dipolar aprotic solvent, such as hexamethylphosphoramide, dimethylformamide, dimethylacetamide, and the like. A particularly preferred reaction solvent is diglyme in that the process is very efficient in terms of time and yield. In the foregoing methods, when it is not desired to isolate the ylid, the efficiency of the reaction is generally increased by increasing the reaction temperature to above room temperature, such as reflux temperature.

For optimum results, it is important that the reaction be conducted under as near anhydrous conditions as possible and preferably under an inert oxygen-free atmosphere such as nitrogen, argon, and the like. While the concentration of the keto carboxylic acid compound and ylid does not appear to be critical, it is preferred to operate at low concentrations of about two to about twenty-five percent by weight of the reaction medium. The aforegoing reaction conditions are largely dependent upon the particular phosphonium ylid and keto carboxylic acid compound employed and are present as a guide. Provided with the foregoing and the examples hereinafter, the most advantageous or optimum conditions and proportions of the keto carboxylic acid compound and phosphonium ylid for a particular α,β-unsaturated carbocyclic ketone are easily determinable by one of ordinary skill in the art using routine experimentation.

The term "lower alkyl" and derivations thereof such as "lower alkoxy," "lower alkylthio," "lower alkanoyloxy" and the like, as used herein, refer to saturated aliphatic hydrocarbon groups (or derivations thereof), branched or straight chain, containing one to six carbon atoms. The term "aryl" refers to phenyl and substituted phenyl, such as tolyl, chlorophenyl, methoxyphenyl, benzyl and the like.

Use of the process of this invention in the synthesis of estradiol and related estrogenic compounds is illustrated by the following procedures wherein $R_1$, $R_2$, $R_3$, $R_4$, $R_5$, $R_6$, $R_7$, $R_9$ and $R_{10}$ are as defined above, $R'_5$ is hydrogen or hydroxy, and $R'_7$ is keto or 17β-hydroxy.

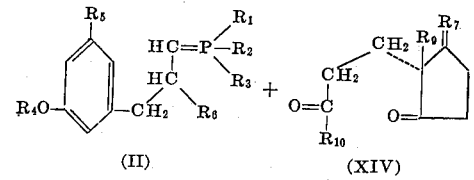

(II)     (XIV)

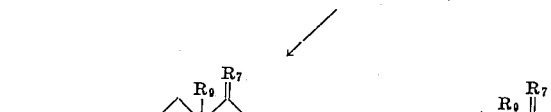

(XVI)     (XIX)

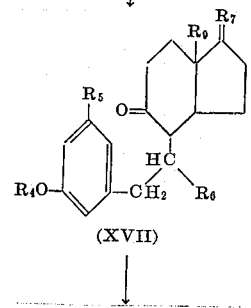

(XVII)

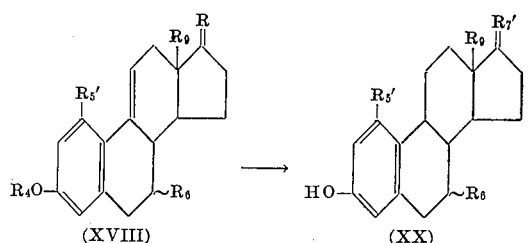

In the procedures shown by the above schematic diagram, the phosphonium ylid of Formula II is reacted with the keto carboxylic acid compound of Formula XIV as described above. For example, the ylid can be prepared in a mixture of monoglyme and hexane to which the keto carboxylic acid compound is added in cold monoglyme. After the initial reaction is substantially complete, that is, the reaction of the ylid is substantially complete, a quantity of hexamethylphosphoramide can be added, and the mixture can be refluxed for several hours to yield the 4-phenylethylene-5,6,7,7a-tetrahydroindan-5-ones (9,10-secoestra-1,3,5(10),8(14)-tetraen-9-ones) of Formula XVI. Hydrogenation of this $\alpha,\beta$-unsaturated ketone using, for example, a five percent palladium-on-carbon catalyst in an inert organic solvent such as benzene yields the corresponding 4-phenylethyleneperhydroindan-5-ones (9,10-secoestra-1,3,5(10)-trien-9-ones) of Formula XVII. The latter compounds can be cyclodehydrated at the reflux temperature of a solvent such as benzene in the presence of a dehydrating acid such as p-toluenesulfonic acid according to conventional procedures to yield the estra-1,3,5(10),9(11)-tetraenes of Formula XVIII. Reduction of the latter compounds, for example, using five percent palladium-on-carbon catalyst in benzene yields the estra-1,3,5(10)-trienes of Formula XX. Alternatively, the $\alpha,\beta$-unsaturated ketones of Formula XVI can first be cyclodehydrated using p-toluenesulfonic acid in benzene as described above or preferably with polyphosphoric acid at 80°C to yield the estra-1,3,5(10),br8,14-pentaenes of Formula XIX. The latter compounds when hydrogenated in the presence of a metal catalyst such as a 10 percent palladium-on-carbon catalyst in benzene yields the estra-1,3,5(10)-triene of Formula XX. Removal of the protecting group at the 17-position ($R_7$) by conventional acid hydrolysis yields the corresponding 3$\beta$-hydroxyestra-1,3,5(10)-triene-17-ones or the estra-1,3,5(10)-triene-3$\beta$,16$\beta$, 17$\beta$depending upon what protected group was present at the 17-position. The compounds of Formula XX are known in the art and are useful for their estrogenic activity.

Phosphonium halides useful in the process of this invention can be prepared as follows:

PREPARATION A 4,4-dimethoxybutyltriphenylphosphonium bromide and 3-carboxy-propyltriphenylphosphonium bromide To 0.5 moles of diethylmalonate in 0.5 liters of dry benzene is added 0.5 moles of sodium hydride cautiously and the mixture stirred until hydrogen evolution ceases. Then 0.5 moles of bromoacetaldehydedimethylacetal [$(CH_3O)_2$—CH—$CH_2$—Br] in 100 ml. of benzene is added and the mixture stirred overnight followed by refluxing for two hours. The reaction mixture is cooled, washed with water and purified by vacuum distillation to give $\beta,\beta$-di-methoxyethylmalonic acid diethyl ester. A mixture of 5 g. of this ester in 100 ml. of ethanol containing 5 g. of sodium hydroxide is heated under reflux until evolution of carbon dioxide ceases. The reaction mixture is then saturated with carbon dioxide and evaporated to dryness under vacuum. The residue is suspended in 50 ml. of dry dimethylformamide to which is added a large excess of methyl iodide. The reaction mixture is stirred at room temperature for about 24 hours and then poured into water. The resulting mixture is extracted with ether and the ether extracts combined, washed with water and evaporated to give $\gamma$-dimethoxybutyric acid methyl ester which is purified by distillation. A mixture of 4 g. of this methyl ester, 50 ml. of dry tetrahydrofuran and 1.1 equivalents of lithium aluminum hydride is refluxed overnight. The reaction mixture is allowed to cool and then diluted with water. This mixture is extracted with ether and the ether extracts are combined, washed, dried and evaporated to dryness to afford 4,4-dimethoxybutanol [$(CH_3O)_2$—CH—$CH_2$—$CH_2$-$CH_2$—OH].

A solution of 0.1 moles of 4,4-dimethoxybutanol in 50 ml. of dimethylformamide containing 0.1 moles of triphenylphosphine is allowed to react for 18 hours with 0.1 moles of carbon tetrabromide. The mixture is diluted with water and extracted with ether. The ether extracts are combined, washed with water, dried and evaporated to a crude product which is purified by distillation to yield 4,4-dimethoxybutylbromide. This bromide on treatment with triphenylphosphine in toluene furnishes 4,4-dimethoxybutyltriphenylphosphoniumbromide.

A mixture of 1 g. of 4,4-dimethoxybutylbromide, 25 ml. of dioxane and 1 ml. of five percent aqueous HCl is heated at reflux for 15 minutes. The mixture is allowed to cool and then is poured into water and separated. The organic phase is evaporated to dryness to furnish the corresponding 3-formylpropylbromide. To a stirred solution of 1 g. of the aldehyde in 10 ml. of acetone, cooled to 0° C is added under nitrogen a solution of 8 N chromic acid (prepared by mixing 26 g. of chromium trioxide with 23 ml. of concentrated sulfuric acid and diluting with water) until the color of the reagent persists in the mixture. The mixture is then stirred for five minutes at 0°–5° C and diluted with water. The solid which forms is collected by filtration, washed with water and dried under vacuum to yield 3-carboxypropylbromide. This bromide on treatment with triphenylphosphine in toluene yields 3-carboxypropyltriphenylphosphonium bromide.

By repeating this procedure using carbon tetrachloride in place of carbon tetrabromide, there is obtained 4,4-dimethoxybutyltriphenylphosphonium chloride and 3-carboxypropyltriphenyl-phosphonium chloride.

Also, by using other tri-substituted phosphines in place of triphenylphosphine in the above procedure, e.g. tri(p-tolyl)phosphine, trichlorophenylphosphine, diphenyltolylphosphine, the corresponding tri-substituted phosphonium bromide and chloride are obtained.

PREPARATION B 4,4-ethylenedioxyhexyltriphenylphosphonium bromide

A solution of 20.9 g. of the ethylene ketal of ethyl 3-bromopropyl ketone (obtained by treating the ketone with ethylene glycol in benzene in the presence of p-toluenesulfonic acid) in 100 ml. of benzene is refluxed with 20 g. of triphenylphosphine for two hours. The mixture is cooled, filtered and the solid material thus collected washed and dried to yield 4,4-ethylenedioxyhexyltriphenylphosphonium bromide,

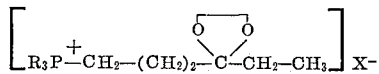

wherein R is phenyl and X is bromo. This is converted to the respective ylid by treatment with butyl lithium, for example, as described above.

The 1-halo-4-alkanone compounds can be prepared, for example, by procedures described in German Pat. No. 801,276 (Dec. 1950) or Jager et al., Arch. Pharm. 293, 896 (1960).

PREPARATION C 3-(2-methoxy-6-methyltetrahydropyran-2-yl)-propyl-triphenyl-phosphonium bromide A suspension of 0.5 g. of 1-chloropentan-4-ol in 40 ml. of methylene chloride is cooled to $-70°$ and then 40 ml. of isobutylene and 0.6 ml. of 93 percent sulfuric acid are added. The mixture is shaken for 17 hours in a pressure vessel. The vessel is then recooled to $-70°$, opened and the solution poured into aqueous sodium bicarbonate with stirring. Isolation with methylene chloride yields the t-butyl ether of 1-chloropentan-4-ol.

A mixture of 0.5 moles of 1,3-dithiane and 300 ml. of tetrahydrofuran cooled to $-30°$ is treated with 0.5 molar equivalents of 1.5 molar n-butyl lithium in hexane under nitrogen and stirred for 15 hours at $-20°$. Then 0.5 moles of the tetrahydropyranyl ether of 3-bromopropanol in 200 ml. of tetrahydrofuran is added slowly with stirring at $-5°$ and then left for 14 hours at $0°$ under nitrogen. The resulting mixture is cooled to $-30°$ and treated with an additional 0.5 molar equivalents of 1.5 molar n-butyl lithium in hexane. After 1.5 hours, 0.5 moles of the t-butyl ether of 1-chloropentan-4-one in 200 ml. of tetrahydrofuran is added. The reaction mixture is left standing for 18 hours at $0°$ and then allowed to warm to room temperature for four hours. Water is added and the resulting mixture extracted with ether. The ether extracts are combined, washed with water, dried and concentrated. The resulting dialkylated thiane 2-[8-(t-butoxy)-4,4-trimethylenedithiononyloxy]-tetrahydropyran,

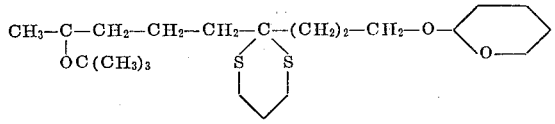

is dissolved in methanol and stirred for 0.5 hour with 20 ml. of one percent oxalic acid solution. The reaction mixture is poured into water containing an excess of sodium carbonate solution and then extracted with ether to afford the corresponding free hydroxy compound. A mixture of 2 g. of the free hydroxy compound and 30 ml. of methylene chloride:pyridine (2:1) is cooled to $-70°$ and then treated with one equivalent of tosyl chloride in methylene chloride. The mixture is left standing at $0°$ for 18 hours and then allowed to warm to room temperature. The mixture is then diluted with water and the resulting tosylate isolated by extraction with methylene chloride and purified by chromatography. The tosylate is dissolved in dry ethylene glycol containing 0.5 g. of mercuric chloride. The mixture is allowed to stand overnight and then heated to $60°$ for five hours. After cooling, water is added and the tosylate of the ketal 8-(t-butoxy)-4,4-ethylenedioxynonanol,

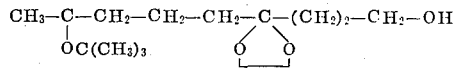

isolated by extraction with ether. This is cyclized by treatment in methanol containing hydrogen chloride at $25°$ for about 12 hours to give the tosylate of 3-(2-methoxy-6-methyl-tetrahydropyran-2-yl)propanol,

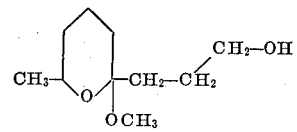

This is converted into the corresponding bromide by treatment with lithium bromide in isopropanol as described above. The bromide is treated with triphenylphosphine in benzene to afford the phosphonium bromide 3-(2-methoxy-6-methyltetrahydropyran-2-yl)propyltriphenylphosphonium bromide

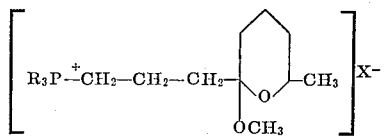

wherein R is phenyl and X is bromo.

Treatment with butyl lithium or phenyl lithium thus gives the corresponding ylid. The other phosphonium halides of this can be prepared similarly by using lithium chloride, lithium iodide or sodium iodide in place of lithium bromide and using other tri-substituted phosphines in place of triphenylphosphine.

PREPARATION D 8-chloro-4,4-ethylenedioxy-7-nonenyltriphenylphosphonium bromide

A mixture of 0.5 moles of 1,3-dithiane and 300 ml. of tetrahydrofuran cooled to $-30°$ is treated with 0.5 molar equivalents of 1.5 molar n-butyl lithium in hexane under nitrogen and stirred for 15 hours at $-20°$. Then 0.5 moles of the tetrahydropyranyl ether of 3-bromopropanol in 200 ml. of tetrahydrofuran is added slowly with stirring at $-5°$ and then left for 14 hours at $0°$ under nitrogen. The resulting mixture is cooled to $-30°$ and treated with an additional 0.5 molar equivalents of 1.5 molar n-butyl lithium in hexane. After 1.5 hours, 0.5 moles of 4-chloro-1-bromopent-3-ene in 200 ml. of tetrahydrofuran is added. The reaction mixture is left standing for 18 hours at $0°$ and then allowed to warm to room temperature for four hours. Water is added and the resulting mixture extracted with ether. The ether extracts are combined, washed with water, dried and concentrated. The resulting dialkylated thiane 2-(8-chloro-4,4-trimethylenedithio-7-nonenyloxy)-tetrahydropyran

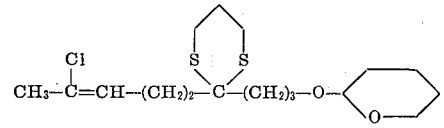

is dissolved in methanol and stirred for two hours with 20 ml. of one percent oxalic acid solution. The reaction mixture is poured into water containing an excess of sodium carbonate solution and then extracted with ether to afford the corresponding free hydroxy compound. A mixture of 2 g. of the free hydroxy compound and 30 ml. of methylene chloride:pyridine (2:1) is cooled to −70° and then treated with one equivalent of tosyl chloride in methylene chloride. The mixture is left standing at 0° for 18 hours and then allowed to warm to room temperature. The mixture is then diluted with water and the resulting tosylate isolated by extraction with methylene chloride and purified by chromatography. The thus-obtained tosylate is dissolved in dry ethylene glycol containing 0.5 g. of mercuric chloride. This reaction mixture is allowed to stand overnight and then heated to 60° for five hours. After cooling, water is added and the corresponding ketal isolated by extraction with ether. The ketal (0.5 g.) in 25 ml. of dry isopropanol and 0.5 g. of lithium bromide is refluxed for 12 hours. After cooling, the reaction mixture is diluted with water and extracted with ether. The resulting 8-chloro-4,4-ethylenedioxy-7-nonenyl bromide

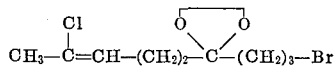

is treated with triphenylphosphine in benzene to yield 8-chloro-4,4-ethylenedioxy-7-nonenyl-triphenylphosphonium bromide

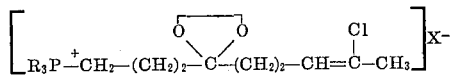

wherein R is phenyl and X is bromo. On treatment with butyl lithium this gives the corresponding ylid.

By using lithium chloride or lithium iodide in the above process, the respective phosphonium chloride or phosphonium iodide are obtained. By using other tri-substituted phosphines, e.g. tricyclohexyl, tribenzyl, tritolyl, trimethyl, tributyl, and the like in place of triphenylphosphine, the corresponding tri-substituted phosphonium compounds are obtained.

PREPARATION E 8,8-ethylenedioxy-4,4-trimethylenedithiononyltriphenylphosphonium bromide and 4,4;8,8-di(ethylenedioxy)nonyltriphenylphosphonium bromide A mixture of 0.5 moles of 1,3-dithiane and 300 ml. of tetrahydrofuran cooled to −30° is treated with 0.5 molar equivalents of 1.5 molar n-butyl lithium in hexane under nitrogen and stirred for 15 hours at −20°. Then 0.5 moles of the ethylene ketal of methyl-3-bromopropyl ketone in 200 ml. of tetrahydrofuran is added slowly with stirring at −5° and then left for 14 hours at 0° under nitrogen. The resulting mixture is cooled to −30° and treated with an additional 0.5 molar equivalents of 1.5 molar n-butyl lithium in hexane. After 15 hours, 0.5 moles of 1-bromo-3-iodopropane in 200 ml. of tetrahydrofuran is added. The resulting mixture is left standing for 18 hours at 0° C and then allowed to warm to room temperature and stand for four hours. Water is added and the resulting mixture extracted with ether. The ether extracts are combined, washed with water, dried and evaporated to yield 4,4-ethylenedioxy-8,8-trimethylene dried and evaporated to yield 4,4-ethylenedioxy-8,8-trimethylenedithiononyl bromide

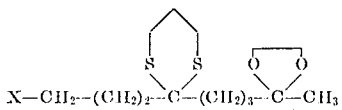

wherein R is phenyl and X is bromo. This 1-bromo compound is dissolved in dry ethylene glycol containing 0.5 g. of mercuric chloride. The mixture is allowed to stand overnight and then heated to 60° for five hours. After cooling, water is added and the corresponding diketal 4,4;8,8-di(ethylenedioxy)-nonyl bromide

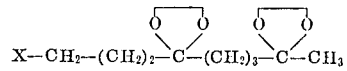

wherein R is phenyl and X is bromo is isolated by extraction with ether. The diketal is treated with triphenylphosphine in benzene to afford 4,4;8,8-di(ethylenedioxy)-nonyltriphenyl-phosphonium bromide

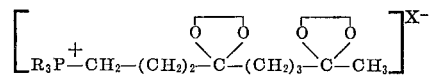

wherein R is phenyl and X is bromo. On treatment with butyl or phenyl lithium this gives the corresponding ylid.

The trimethylenedithio compound can be similarly treated with triphenylphosphine to yield 4,4-ethylenedioxy-8,8-trimethylenedithiononyltriphenylphosphonium bromide

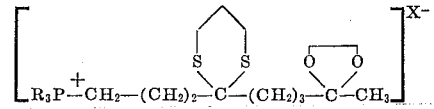

wherein R is phenyl and X is bromo. This can be converted into the corresponding ylid as described above.

Similarly, other tri-substituted phosphines can be used in place of triphenylphosphine to prepare other compounds of formulas.

This invention is further illustrated by the following specific but non-limiting examples.

EXAMPLE 1

1-(lower)alkyl-5-oxo-cyclopent-1-ylpropionates

A mixture of 0.3 g. of 2-methylcyclopentane-1,3-dione, 0.33 ml. of methyl acrylate and a catalytic amount of sodium methoxide in 10 ml. of dimethylformamide is refluxed for two hours. The reaction mixture is evaporated to a small volume, diluted with aqueous sodium hydroxide, nd extracted with ether. The extract is washed until neutral with water, dried and evaporated to yield methyl 1-methyl-2,5-dioxo-cyclopent-1-ylpropionate which is purified by distillation. A mixture of 1 g. of the latter compound, 25 ml. of dry benzene, 1 molar equivalent of ethylene glycol and 50 mg. of p-toluenesulfonic acid monohydrate is refluxed for 16 hours using a water separater. The reaction mixture is then washed with water, dried and evaporated to dryness to yield methyl 2,2-ethylenedioxy-1-methyl-5-oxo-cyclopent-1-ylpropionate which is purified by chromatography on silica gel, eluting with benzene-ether.

Repeating the above procedure with ethyl acrylate, propyl acrylate, n-butyl acrylate, n-pentyl acrylate, n-hexyl acrylate, benzyl acrylate, phenyl acrylate, tolyl acrylate, p-propylphenyl acrylate yields the corresponding, respective ethyl, propyl, n-butyl, n-pentyl, n-hexyl, benzyl, phenyl, tolyl and p-propyl-phenyl 2,2-ethylenedioxy-1-methyl-5-oxocyclopent-1-yl-propionates.

Repeating the above procedures with methyl acrylate and the other enumerated acrylates but replacing 2-methylcyclopentan-1,3-dione with 2-ethylcyclopentan-1,3-dione, 2-propylcyclopentan-1,3-dione, 2-(n-butyl)cyclopentan-1,3-dione, 2-(n-pentyl)cyclopentan-1,3-dione, and 2-(n-hexyl)cyclopentan-1,3-dione yields the corresponding methyl, ethyl, propyl, n-butyl, n-pentyl, n-hexyl, benzyl, phenyl, tolyl and p-propylphenyl esters of 2,2-ethylenedioxy-1-ethyl-5-oxocyclopent-1-yl-propionic acid, 2,2-ethylenedioxy-5-oxo-1-propylcyclopent-1-yl-propionic acid, 1-(n-butyl)-2,2-ethylenedioxy-5-oxocyclopent-1-yl-propionic acid, 2,2-ethylenedioxy-5-oxo-1-(n-pentyl)cyclopent-1-yl-propionic acid, and 2,2-ethylenedioxy-1-(n-hexyl)-5-oxocyclopent-1-yl-propionic acid, respectively.

The 1-alkyl-5-oxocyclopent-1-ylpropionates can also be prepared according to the procedure described in French Pat. No. 1,496,817.

EXAMPLE 2

2,2-ethylenedioxy-1-(lower)alkyl-5-oxocyclopent-1-yl-propionic acid

One gram of methyl 2,2-ethylenedioxy-1-methyl-5-oxocyclopent-1-ylpropionate is hydrolyzed in a methanolic KOH solution at room temperature for 24 hours, and the reaction mixture is then carefully neutralized with 0.1 N hydrochloric acid to a pH of 2–3. The solvent is then evaporated, the residue extracted with ether, and the ether solution washed with aqueous sodium bicarbonate, aqueous sodium chloride solution, and then dried to yield 2,2-ethylenedioxy-1-methyl-5-oxocyclopent-1-ylpropionic acid.

Repeating the above procedure with the other esters produced in Example 1 yields the corresponding 2,2-ethylenedioxy-1-ethyl-5-oxocyclopent-1-yl-propionic acid, 2,2-ethylenedioxy-5-oxo-1-propylcyclopent-1-yl-propionic acid, 1-(n-butyl)-2,2-ethylenedioxy-5-oxocyclopent-1-yl-propionic acid, 2,2-ethylenedioxy-5-oxo-1-(n-pentyl)cyclopent-1-yl-propionic acid, and 2,2-ethylenedioxy-1-(n-hexyl)-5-oxocyclopent-1-yl-propionic acid, respectively.

EXAMPLE 3

2,2-ethylenedioxy-1-(lower)alkyl-5-oxocyclopent-1-yl-propionyl chloride

One molar equivalent of 2,2-ethylenedioxy-1-methyl-5-oxocyclopent-1-ylpropionic acid is added to a solution of one molar equivalent of triphenylphosphine and one molar equivalent of carbon tetrachloride, and the mixture is maintained at room temperature for one hour. The reaction product is evaporated to dryness to yield 2,2-ethylenedioxy-1-methyl-5-oxocyclopent-1-yl-propionyl chloride. This is immediately dissolved in tetrahydrofuran and used since it is relatively unstable.

Repeating the above procedure with the products of Example 2 yields the corresponding 2,2-ethylenedioxy-1-ethyl-5-oxocyclopent-1-yl-propionyl chloride, 2,2-ethylenedioxy-5-oxo-1-propylcyclopent-1-yl-propionyl chloride, 1-(n-butyl)-2,2-ethylenedioxy-5-oxocyclopent-1-yl-propionyl chloride, 2,2-ethylenedioxy-5-oxo-1-(n-pentyl)cyclopent-1-yl-propionyl chloride, and 2,2-ethylenedioxy-1-(n-hexyl)-5-oxocyclopent-1-yl-propionyl chloride, respectively.

EXAMPLE 4

2,2-ethylenedioxy-1-(lower)alkyl-5-oxocyclopent-1-yl-propionyl bromide

Repeating the procedure of Example 3 but replacing carbon tetrachloride with a solution of 10 g. of carbon tetrabromide in 50 ml. of hexane yields the corresponding 2,2-ethylenedioxy-1-ethyl-5-oxocyclopent-1-yl-propionyl bromide, 2,2-ethylenedioxy-5-oxo-1-propylcyclopent-1-yl-propionyl bromide, 1-(n-butyl)-2,2-ethylenedioxy-5-oxocyclopent-1-yl-propionyl bromide, 2,2-ethylenedioxy-5-oxo-1-(n-pentyl)cyclopent-1-yl-propionyl bromide, and 2,2-ethylenedioxy-1-(n-hexyl)-5-oxocyclopent-1-yl-propionyl bromide, respectively.

EXAMPLE 5

2,2-ethylenedioxy-1-(lower)alkyl-5-oxocyclopent-1-yl-propionic acid anhydrides of lower aliphatic carboxylic acids A methanol solution of 1 g. mole of 2,2-ethylenedioxy-1-methyl-5-oxocyclopent-1-ylpropionic acid is titrated to neutrality with methanolic potassium hydroxide and evaporated to yield the corresponding potassium salt. To a suspension of this salt in benzene is added 1 g. mole of acetic anhydride, and the mixture is maintained at room temperature for one hour. The solvent is then filtered and evaporated to yield 2,2-ethylenedioxy-1-methyl-5-oxocyclopent-1-ylpropionic acid acetic acid anhydride. This is immediately dispersed in tetrahydrofuran and used since it is relatively unstable.

Repeating the above procedure with the other acids produced in Example 2 yields the corresponding 2,2-ethylenedioxy-1-ethyl-5-oxocyclopent-1-yl-propionic acid acetic acid anhydride, 2,2-ethylenedioxy-5-oxo-1-propylcyclopent-1-yl-propionic acid acetic acid anhydride, 1-(n-butyl)-2,2-ethylenedioxy-5-oxocyclopent-1-yl-propionic acid acetic acid anhydride, 2,2-ethylenedioxy-5-oxo-1-(n-pentyl)cyclopent-1-yl-propionic acid acetic acid anhydride, and 2,2-ethylenedioxy-1-(n-hexyl)-5-oxocyclopent-1-yl-propionic acid acetic acid anhydride, respectively.

Repeating the above procedure with acyl chlorides of other lower aliphatic carboxylic acids such as propionyl chloride, butyryl chloride, valeryl chloride and the like yields the corresponding 2,2-ethylenedioxy-1-(lower)alkyl-5-oxocyclopent-1-ylpropionic acid anhydrides of the respective lower aliphatic carboxylic acids.

EXAMPLE 6

S-(lower)alkyl 2,2-ethylenedioxy-1-(lower)alkyl-5-oxocyclopent-1-ylpropanethioates One gram mole of 2,2-ethylenedioxy-1-methyl-5-oxocyclopent-1-ylpropionyl chloride in 25 ml. of a 1:1 pyridine-benzene solution is mixed with 1 g. mole of methylmercaptan in 25 ml. of a 1:1 pyridine-benzene solution, the reaction mixture is maintained at room temperature for one hour. The solvent is evaporated, and the residue is extracted with ether. The ether phase is washed with aqueous sodium bicarbonate, then aqueous sodium chloride, and then dried to yield S-methyl 2,2-ethylene dioxy-1-methyl-5-oxocyclopent-1-ylpropanethioate.

Repeating the above procedure with other lower alkyl mercaptans such as ethyl mercaptan, propyl mercaptan, n-butyl mercaptan, n-pentyl mercaptan, and n-hexyl mercaptan yields the corresponding S-ethyl, S-propyl, S-(n-butyl), S-(n-pentyl) and S-(n-hexyl) 2,2-ethylenedioxy-1-methyl-5-oxocyclopent-1-ylpropanethioates.

Repeating the above procedures with the other propionyl chlorides produced in Example 3 yields the corresponding S-methyl, S-propyl, S-(n-butyl), S-ethyl, S-(n-pentyl) and S-(n-hexyl) thioates of the respective 2,2-ethylenedioxy-1-(lower)alkyl-5-oxocyclopent-1-ylpropanes.

EXAMPLE 7

In a tetrahydrofuran solution (50 ml.) under a nitrogen atmosphere, 7 g. of methyltriphenylphosphonium bromide was suspended. To this suspension was added with stirring 11.4 ml. of a 1.6 M solution of butyl lithium in hexane. The mixture was stirred for 17 minutes at room temperature, and a solution of 2.1 g. of methyl 2,2-ethylenedioxy-1-methyl-5-oxocyclopent-1-ylpropionate in 15 ml. of tetrahydrofuran was added. The mixture was held at room temperature for 24 hours, concentrated in vacuo, diluted with water, and extracted with ether to isolate the intermediate ylid. 1.6 Grams of the intermediate ylid was dissolved in dry ethanol, and 1.0 g. of dry sodium ethoxide was added thereto. The mixture was refluxed for seven hours under a nitrogen atmosphere, the solvent was removed in vacuo, and the product was extracted with ether and purified by chromatography on silica gel, eluting with benzene-ether to yield 1,1-ethylene-dioxy-7a-methyl-5,6,7,7a-tetrahydroindan-5-one.

The above-prepared α,β-unsaturated bicarbocyclic ketone is a valuable intermediate for the synthesis of steroids using the method of Whitehurst et al., U.S. Pat. No. 3,317,566, for example.

EXAMPLE 8

A solution of 1.6 ml. of methylenetriphenylphosphorane in 25 ml. of monoglyme (1,2-dimethoxyethane) is prepared under nitrogen by adding 2.4 equivalents of phenyl lithium to a dry monoglyme suspension of 1.2 equivalents of methyltriphenylphosphonium bromide with stirring followed by stirring the mixture for 30 minutes. A solution of 7.2 ml. of a 1.6 M solution of butyl lithium in hexane is added, and the solution is stirred for 17 minutes at room temperature. Then, 2.1 g. of methyl 2,2-ethylenedioxy-1-methyl-5-oxocyclopent-1-ylpropionate in 15 ml. of monoglyme is added, and the reaction mixture is left at room temperature for 24 hours. Then 12 ml. of hexamethylphosphoramide is added to the reaction mixture, and it is refluxed for six hours under nitrogen. The reaction mixture is cooled, poured into an ether-benzene solution, and the organic layer is washed with water and evaporated to yield 1,1-ethylenedioxy-7a-methyl-5,6,7,7a-tetrahydroindan-5-one which is purified by chromatography on silica gel, eluting with benzene-ether.

EXAMPLE 9

Repeating the procedure of Example 8 but replacing methyl 2,2-ethylenedioxy-1-methyl-5-oxocyclopent-1-ylpropionate with ethyl 2,2-ethylenedioxy-1-methyl-5-oxocyclopent-1-ylpropionate, phenyl 2,2-ethylenedioxy-1-methyl-5-oxocyclopent-1-ylpropionate, tolyl 2,2-ethylenedioxy-1-methyl-5-oxocyclopent-1-ylpropionate, benzyl 2,2-ethylenedioxy-1-methyl-5-oxocyclopent-1-ylpropionate, S-methyl 2,2-ethylenedioxy-1-methyl-5-oxocyclopent-1-ylpropanethioate, S-propyl 2,2-ethylenedioxy-1-methyl-5-oxocyclopent-1-ylpropanethioate, 2,2-ethylenedioxy-1-methyl-5-oxocyclopent-1-ylpropionyl bromide, and 2,2-ethylenedioxy-1-methyl-5-oxocyclopent-1-ylpropionyl chloride, yields 1,1-ethylenedioxy-7a-methyl-5,6,7,7a-tetrahydroindan-5-one.

Repeating this procedure with other propionates, propanethioates and propionyl halides, e.g., methyl 1-(n-butyl)-2,2-ethylenedioxy-5-oxocyclopent-1-ylpropionate, phenyl 2,2-ethylenedioxy-1-ethyl-5-oxocyclopent-1-ylpropionate, and S-propyl 2,2-ethylenedioxy-5-oxo-1-propylcyclopent-1-ylpropanethioate yields the corresponding 5,6,7,7a-tetrahydroindan-g5-ones, that is, 7a-(n-butyl)-1,1-ethylenedioxy-5,6,7,7a-tetrahydroindan-5-one, 1,1-ethylenedioxy-7a-ethyl-5,6,7,7a-tetrahydroindan-5-one, and 1,1-ethylenedioxy-7a-propyl-5,6,7,7a-tetrahydroindan-5-one.

EXAMPLE 10

Repeating the procedure of Example 8 but replacing methylenetriphenylphosphorane with substituted methylenetriphenylphosphoranes such as, for example, methylmethylenetriphenylphosphorane, 3-cycloethylenedioxybutylmethylenetriph enylphosphorane, 3,3-dimethoxypropylmethylenetriphenylphosphorane, ethylmethylenetriphenylphosphorane, n-propylmethylenetriphenylphosphorane, and the like, the corresponding 1,1-ethylenedioxy-7a-methyl-5,6,7,7a-tetrahydroindan-5-one is obtained having at the 4-position the respective methyl, 3-cycloethylenedioxy-butyl, 3,3-dimethoxypropyl, ethyl and n-propyl group.

EXAMPLE 11

To 3 g. of 3-(3,5-dimethoxyphen-1-yl)prop-1-ylidenetriphenylphosphorane in 50 ml. of dry monoglyme under nitrogen, there is added two molar equivalents of methyl 2,2-ethylenedioxy-1-methyl-5-oxocyclopent-1-ylpropionate in 75 ml. of dry monoglyme. The reaction mixture is allowed to stand for seven hours at room temperature, 150 ml. of diglyme and 50 ml. of hexamethylphosphoramide are added, and then the mixture is heated at reflux for 20 hours. After cooling, water is added, and the product isolated by extraction with chloroform and purified by chromatography on alumina to yield 1,1-ethylenedioxy-7a-methyl-4-(3,5-dimethoxy-1-phenylethylene)-5,6,7,7a-tetrahydroindan-5-one.

Repeating this procedure with other 3-(phen-1-yl)prop-1-ylidenetriphenylphosphoranes and cyclopentylpyopionic acid compounds of Formulas II and XIV above yields the corresponding compounds of Formula XVI, e.g.

1,1-ethylenedioxy-7a-methyl-4-(3-methoxyphen-1-ylethyl)-5,6,7,7a-tetrahydroindan-5-one, 1,1-ethylenedioxy-7a-ethyl-4-(3,5-dimethoxyphen-1-ylethyl)-5,6,7,7a-tetrahydroindan-5-one, 1,1-ethylenedioxy-7a-ethyl-4-(3-methoxyphen-1-ylethyl)-5,6,7,7a-tetrahydroindan-5-one, 1,1-ethylenedioxy-7a-propyl-4-(3,5-dimethoxyphen-1-ylethyl)-5,6,7,7a-tetrahydroindan-5-one, 1,1-ethylenedioxy-7a-propyl-4-(3-methoxyphen-1-ylethyl)-5,6,7,7a-tetrahydroindan-5-one, 1,1-ethylenedioxy-7a-ethyl-4-[3-(3,5-dimethoxyphen-1-yl)-propyl]-5,6,7,7a-tetrahydroindan-5-one, 1,1-ethylenedioxy-7a-methyl-4-[3-(3,5-dimethoxyphen-1-yl)-propyl]-5,6,7,7a-tetrahydroindan-5-one, and the like.

EXAMPLE 12

To a suspension of 7 g. of methyltriphenylphosphonium bromide in 50 ml. of tetrahydrofuran was added with stirring, 11.4 ml. of a 1.6 M solution of butyl lithium in hexane. The mixture was stirred for 17 minutes at room temperature, and a solution of 2.1 g. of methyl 2,2-ethylenedioxy-1-methyl-5-oxo-cyclopent-1-ylpropionate in 15 ml. of tetrahydrofuran was added. The mixture was held at room temperature for 24 hours, and a solution of 1 g. sodium methoxide in 50 ml. of dry ethanol was added thereto.

The mixture was refluxed for seven hours under a nitrogen atmosphere, the solvent was removed in vacuo, and the product was extracted with ether and purified by chromatography on silica gel to yield 1,1-ethylenedioxy-7a-methyl-5,6,7,7a-tetrahydroindan-5-one.

EXAMPLE 13

4-(2-carboxyethyl)-7a-methyl-5,6,7,7a-tetrahydroindan-1,5-dione

To a suspension of 4 g. of 4,4-dimethoxybutyltriphenylphosphonium bromide in 50 ml. of dry monoglyme under nitrogen, there is added 2.4 equivalents of phenyl lithium in hexane with stirring. This mixture is stirred for about 30 minutes, and then 1.1 equivalents of methyl 2,2-ethylenedioxy-1-methyl-5-oxocyclopent-1-ylpropionate in 50 ml. of dry monoglyme is added. The reaction mixture is heated at reflux for about three hours and then is allowed to cool to room temperature. The reaction mixture is then diluted with water and extracted with ether. The ether extracts are combined, washed, dried over magnesium sulfate, and evaporated under reduced pressure. The residue is chromatographed on silica to provide 1,1-ethylenedioxy-4-(3,3-dimethoxypropyl)-7a-methyl-5,6,7,7a-tetrahydroindan-5-one. A mixture of 1 g. of the latter ketone, 25 ml. of methanol and 1 ml. of concentrated HCl is boiled for 15 minutes. The reaction mixture is allowed to cool, poured into water, and the resulting mixture separated. The organic phase is evaporated to dryness to furnish 4-(2-formylethyl)-7a-methyl-5,6,7,7a-tetrahydroindan-1,5-dione which is taken up in 20 ml. of acetone, cooled to 0° C, and a slight molar excess of Jones reagent (prepared by mixing 26 g. of chromium trioxide with 23 ml. of concentrated sulfuric acid and diluting with water to 100 ml.) is added. Upon completion of the oxidation as followed by thin layer chromatography, the reaction mixture is diluted with water and then combined with ethyl acetate. The ethyl acetate extracts are combined, washed with water, dried and evaporated under reduced pressure to yield 4-(2-carboxyethyl)-7a-methyl-5,6,7,7a-tetrahydroindan-1,5-dione. This product is a valuable intermediate for the synthesis of known 19-nor-$\Delta^4$ and $\Delta^{5(10)}$ steroids useful as therapeutic agents using the procedure of, for example, Belgium Pat. No. 629,251 (1963); French Pat. No. 1,465,400 (1965); Netherlands Pat. No. 6,414,702; or Velluz et al., Tetrahedrin, Suppl. 8 Part II, pp. 495–505 (1966).

Repeating the procedure with the other corresponding 2,2-ethylenedioxy-1-(lower)alkyl-5-oxocyclopent-1-ylpropionates produced in Example 1 yields the corresponding 7a-(lower)alkyl compounds.

As an alternate procedure, sufficient phenyl lithium in hexane is added with stirring to a suspension of 4 g. of 3-carboxypropyltriphenylphosphonium bromide in 50 ml. of dry monoglyme under nitrogen to provide 2.4 molar equivalents of phenyl lithium after neutralization of the acid. This mixture is stirred for 30 minutes, and then 1.1 molar equivalents of methyl 2,2-ethylenedioxy-1-methyl-5-oxocyclopent-1-ylpropionate in 50 ml. of dry monoglyme is added. The reaction mixture is heated at reflux for about three hours and is allowed to cool to room temperature. The reaction mixture is then diluted with water and acidified with hydrochloric acid, and extracted with ethyl acetate. The ethyl acetate extract is washed with water, dried and evaporated under reduced pressure. The residue is chromatographed on silica to yield 4-(2-carboxyethyl)-7a-methyl-5,6,7,7a-tetrahydroindan-1,5-dione.

Repeating this alternate procedure with the other corresponding 2,2-ethylenedioxy-1-(lower)alkyl-5-oxocyclopent-1-yl-propionates produced in Example 1 yields the corresponding 7a-(lower)alkyl compounds.

EXAMPLE 14

2,5-dimethyl-1,2-(3'-oxocyclopentano)-1,2,3,4,6,7,8,8a-octa-hydronaphthylene-6-one Repeating the procedure of Example 8 but replacing methyltriphenylphosphonium bromide with 4,4-ethylenedioxyhexyltriphenylphosphonium bromide yields the corresponding 1,1-ethylenedioxy-4-(3,3-ethylenedioxypentyl)-7a-methyl-5,6,7,7a-tetrahydroindan-5-one. One gram of this compound in 100 ml. of 80 percent acetic acid is refluxed under nitrogen for seven hours. The mixture is concentrated under vacuum and poured into water. The solid formed is separated by filtration, washed with water and dried. Two grams of this compound in 25 ml. of 0.2 percent triethylamine and 100 ml. of 95 percent aqueous ethanol is hydrogenated at room temperature and room pressure over five percent palladium-on-charcoal until one equivalent of hydrogen is absorbed. The mixture is filtered and the filtrate evaporated to yield 2,5-dimethyl-1,2-(3'-oxo-cyclopentano)-1,2,3,4,6,7,8,8a-oc-tahydronaphthylene-6-one which can be represented as follows:

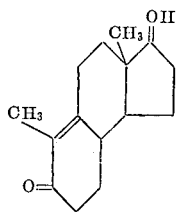

This compound is an intermediate for $\Delta^4$-androstenes or retrosteroids using the procedure of, for example, Netherlands Pat. No. 6,707,919 (1967).

Repeating the above procedure with the other 2,2-ethylenedioxy-1-(lower)alkyl-5-oxocyclopent-1-yl-propionates produced in Example 1 yields the corresponding 7a-(lower)alkyl compounds.

EXAMPLE 15

2-methyl-5-(3-oxobutyl)-1,2-(3'-oxocyclopentano)perhydronaphthylen-6-one

Repeating the procedure of Example 8 but replacing methyltriphenylphosphonium bromide with 3-(2-methoxy-6-methyltetrahydropyran-2-yl)propyltriphenylphosphonium bromide yields the corresponding 1,1-ethylenedioxy-4-(2-methoxy-6-methyltetrahydropyran-2-ylethyl)-7a-methyl-5,6,7,7a-tetrahydroindan-5-one. This compound is hydrolyzed with sulfuric acid in aqueous dioxane. Two grams of the product in 25 ml. of 0.2 percent triethylamine and 100 ml. of 95 percent aqueous ethanol is hydrogenated at room temperature and room pressure over five percent palladium-on-charcoal until one equivalent of hydrogen is absorbed. The mixture is filtered, and the filtrate evaporated to yield a solid residue.

A mixture of 1 g. of the residue, 100 ml. of methanol, 10 ml. of ether, and 20 ml. of 37 percent hydrochloric acid is heated at reflux for two hours under nitrogen. The solvent is removed under reduced pressure, and isolation with ether yields the unsaturated tricarbocyclic diketone 5-(3-hydroxybutyl)-2-methyl-1,2-(3'-oxocyclopentano)-1,2,3,4,6,7,8,8a-oc-tahydronaphthylen-6-one. This is hydrogenated using the procedure described above to yield the corresponding saturated tricarbocyclic diketone which is oxidized using chromium trioxide in pyridine or Jones reagent as described in Example 13 to yield the saturated triketone 2-methyl-5-(3-oxobutyl)-1,2-(3'-oxocyclopentano)perhydronaphthylen-6-one.

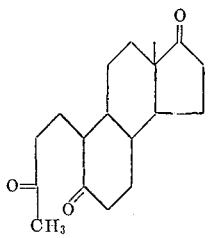

This compound is a useful intermediate for the preparation of steroids according to procedures described in French Pat. No. 1,465,400 and U. S. Pat. No. 3,413,314 (1968).

Repeating this procedure with the other corresponding 2,2-ethylenedioxy-1-(lower)alkyl-5-oxocyclopent-1-ylpropionate produced in Example 1 yields the corresponding 7a-(lower)alkyl compounds.

EXAMPLE 16

5-(3-chloro-2-buten-1-yl)-2-methyl-1,2-(3'-oxocyclopentano)-1,2,3,4,6,7,8,8a-octahydronaphthylen-6-one Repeating the procedure of Example 8 but replacing methyltriphenylphosphonium bromide with 8-chloro-4,4-ethylenedioxy-7-nonen-1-yltriphenylphosphonium bromide yields the corresponding 4-(7-chloro-3,3-ethylenedioxy-6-octen-1-yl)-1,1-ethylenedioxy-7a-methyl-5,6,7,7a-tetrahydroindan-5-one. This compound is then hydrolyzed, hydrogenated, and then cyclized with aqueous hydrochloric acid by the procedure described in Example 15 to yield 5-(3-chloro-2-buten-1-yl)-2-methyl-1,2-(3'-oxocyclopentano)-1,2,3,4,6,7,8,8a-octahydronaphthylen-6-one which can be represented as follows:

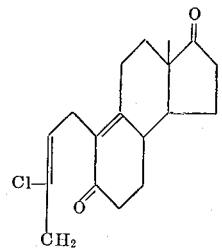

The above tricarbocyclic ketone is a useful intermediate for the synthesis of aromatic steroids using the procedure of U. S. Pat. Nos. 3,050,550 and 3,150,152.

Repeating this procedure with the other corresponding 2,2-ethylenedioxy-1-(lower)alkyl-5-oxocyclopent-1-ylpropionates produced in Example 1 yields the corresponding 7a-(lower)alkyl compounds.

EXAMPLE 17

2-methyl-5-(3-oxobutyl)-1,2-(3'-oxocyclopentano)perhydronaphthylen-6-one

Repeating the procedure of Example 8 but replacing methyltriphenylphosphonium bromide with 4,4;8,8-di(ethylenedioxy)-non-1-yltriphenylphosphonium bromide yields the corresponding 1,1-ethylenedioxy-4-[3,3:7,7-di(ethylenedioxy)octyl]-7a-methyl-5,6,7,7a-tetrahydroindan-5-one. This compound is then hydrolyzed, hydrogenated, cyclized with aqueous hydrochloric acid, and then hydrogenated by the procedure described in Example 15 to yield 2-methyl-5-(3-oxobutyl)-1,2-(3'-oxocyclopentano)perhydronaphthylen-6-one.

Repeating the procedure of Example 8 but replacing methyltriphenylphosphonium bromide with 8,8-ethylenedioxy-4,4-tri-methylenedithionon-1-yltriphenylphosphonium bromide yields the corresponding 1,1-ethylenedioxy-4-(7,7-ethylenedioxy-3,3-trimethylenedithiooct-1-yl)-7a-methyl-5,6,7,7a-tetrahydroindan-5-one. This compound is then hydrolyzed, hydrogenated, cyclized with aqueous hydrochloric acid and then hydrogenated by the procedure described in Example 15 to yield 2-methyl-5-(3-oxobutyl)-1,2-(3'-oxocyclopentano)perhydronaphthylen-6-one.

Repeating this procedure with the other corresponding 2,2-ethylenedioxy-1-(lower)alkyl-5-oxocyclopent-1-ylpropionates produced in Example 1 yields the corresponding 7a-(lower)alkyl compounds.

EXAMPLE 18

Repeating the procedure of Example 8 but replacing methyl 2,2-ethylenedioxy-1-methyl-5-oxocyclopent-1-ylpropionate with methyl 2-methoxy-1-methyl-5-oxocyclopent-1-ylpropionate, methyl 2-ethoxy-1-methyl-5-oxocyclopent-1-ylpropionate, methyl 1-methyl-5-oxo-2-(tetrahydropyran-2-yloxy)cyclopent-1-ylpropionate, methyl 2-(t-butoxy)-1-methyl-5-oxocyclopent-1-ylpropionate, and methyl 2-(4-methoxytetrahydropyran-4-yloxy)-1-methyl-5-oxo-cyclopent-1-ylpropionate, yields the corresponding 1-methoxy-7a-methyl-5,6,7,7a-tetrahydroindan-5-one, 1-ethoxy-7a-methyl-5,6,7,7a-tetrahydroindan-5-one, 7a-methyl-1-(tetrahydropyran-2-yloxy)-5,6,7,7a-tetrahydroindan-5-one, 1-(t-butoxy)-7a-methyl-5,6,7,7a-tetrahydroindan-5-one, and 1-(4-methoxytetrahydropyran-4-yloxy)-7a-methyl-5,6,7,7a-tetrahydroindan-5-one, respectively.

The 2-ethers used in this procedure are prepared as follows: A solution of 200 mg. of sodium 1-methyl-2,5-dioxocyclopent-1-yl-propionate in 32 ml. of anhydrous isopropanol and 25 mg. of sodium borohydride is stirred at room temperature for 15 hours. 100 Milliliters of water is added, and the resulting suspension extracted several times with ether. The ether phase is dried over sodium sulfate and evaporated to dryness under reduced pressure to yield sodium 2-hydroxy-1-methyl-5-oxocyclopent-1-ylpropionate, which may be further purified by recrystallization from ether.

To a solution of 0.1 g. moles of sodium 2-hydroxy-1-methyl-5-oxocyclopent-1-ylpropionate in 200 ml. of methanol, 15.5 g. of methyl iodide and 14 g. of potassium carbonate is added. The mixture is stirred overnight, diluted with water and extracted with ether. The ether phase is dried over sodium sulfate and evaporated to dryness under reduced pressure to yield methyl 2-hydroxy-1-methyl-5-oxocyclopent-1-ylpropionate.

To a solution of 1 g. of methyl 2-hydroxy-1-methyl-5-oxocyclopent-1-ylpropionate in 25 ml. of DMF is added three molar equivalents of methyl iodide and 2 molar equivalents of silver oxide. The mixture is maintained at room temperature for 12 hours, filtered, evaporated under reduced pressure to yield methyl 2-methoxy-1-methyl-5-oxocyclopent-1-ylpropionate which is recrystallized from chloroform:methanol. Repeating this procedure with ethyl iodide yields methyl 2-ethoxy-1-methyl-5-oxocyclopent-1-yl-propionate.

Two milliliters of dihydropyran are added to a solution of 1 g. of methyl 2-hydroxy-1-methyl-5-oxocyclopent-1-ylpropionate in 15 ml. of benzene. About 1 ml. is removed by distillation to remove moisture, and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield methyl 1-methyl-5-oxo-2-(tetrahydropyran-2-yloxy)-cyclopentylpropionate which is recrystallized from pentane.

Repeating the above procedure but replacing dihydropyran with 4-methoxy-5,6-dihydro-2H-pyran yields methyl 1-(4-methoxytetrahydropyran-4-yloxy)-1-methyl-5-oxocyclopentylpropionate.

To a solution of 1 g. of methyl 2-hydroxy-1-methyl-5-oxocyclopent-1-ylpropionate in 25 ml. of methylene dichloride is added liquid isobutylene. A catalytic amount of concentrated sulfuric acid is added, and the mixture is agitated in a sealed bomb overnight at room temperature. The reaction mixture is then washed with aqueous sodium bicarbonate solution, evaporated, and recrystallized from chloroform:methanol to yield methyl 2-(t-butoxy)1-methyl-5-oxocyclopent-1-ylpropionate.

The invention claimed is:

1. A process for producing 4-substituted-4,6,7,7a-tetrahydroindan-5-ones comprising reacting, under anhydrous conditions in an organic solvent inert to the reaction, a methylene phosphonium ylid with a 2oxo-1-cyclopentylpropionic acid derivative, at least two molar equivalents of said ylid being present for each mole of said 2-oxo-1-cyclopentylpropionic acid derivative, said methylene phosphonium ylid being selected from the group represented by the formulas:

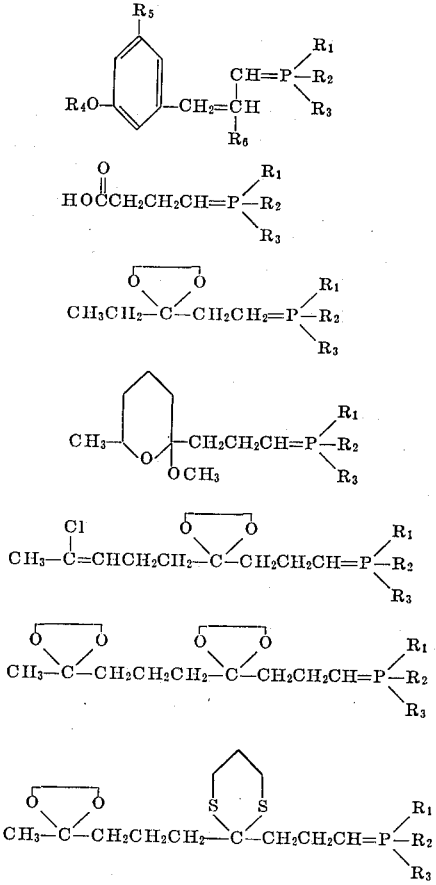

wherein R₄ is an alkaline-stable, acid-labile protecting group, R₅ is hydrogen or lower alkoxy, R₆ is hydrogen or methyl, and each of $R_1$, $R_2$ and $R_3$ is selected from the group consisting of substituted and unsubstituted, saturated and unsaturated, aliphatic and carbocyclic radicals and lower alkoxy radicals, and said 2oxo-1-cyclopentylpropionic acid derivative being selected from the group represented by the formula:

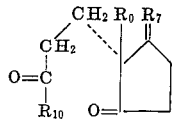

wherein $R_7$ is a lower alkylenedioxy or

wherein $R_8$ is a lower alkoxy, tetrahydropyran-2-yloxy, tetrahydrofuran-2-yloxy or 4-methoxytetrahydropyran-4-yloxy; $R_9$ is lower alkyl; and $R_{10}$ is lower alkoxy, aryloxy having up to 10 carbons, lower alkylthio, lower alkanoyloxy, bromo or chloro.

2. The process of claim 9 wherein the methylene phosphonium ylid has the formula

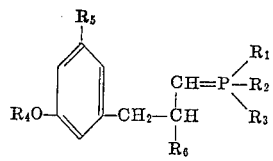

wherein $R_4$ is lower alkyl, tetrahydropyran-2'-yl, tetrahydrofuran-2'-yl or 4'-methoxytetrahydropyran-4'-yl group, $R_5$ is hydrogen or lower alkoxy, $R_6$ is hydrogen or methyl, and each of $R_1$, $R_2$ and $R_3$ is selected from the group consisting of substituted and unsubstituted, saturated and unsaturated, aliphatic and carbocyclic radicals and lower alkoxy radicals.

3. The process of claim 1 wherein the methylene phosphonium ylid is selected from the group of compounds having the formulas

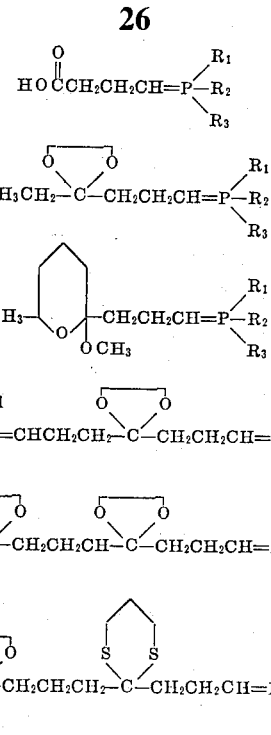

4. The process of claim 1 including the step of adding a lower monohydric aliphatic alcohol and an alkali metal alkoxide or alkaline earth metal alkoxide base to the reaction mixture subsequent to the substantial disappearance of said ylid, and thereafter the reaction mixture is maintained at a temperature of from room temperature to reflux temperature.

5. The process of claim 1 including the step of adding a dipolar aprotic solvent to the reaction mixture subsequent to the substantial disappearance of said ylid, and thereafter the reaction mixture is maintained at a temperature of from room temperature to reflux temperature.

6. The process of claim 5 wherein the dipolar aprotic solvent is hexamethylphosphoramide, and thereafter the reaction mixture is maintained at reflux temperature.

7. The process of claim 3 wherein said organic solvent is diglyme, and the reaction mixture is maintained at reflux temperature.

* * * * *